United States Patent [19]
Abernathy

[11] 4,223,477
[45] Sep. 23, 1980

[54] HOUSE PLANT SPRAYER SHROUD

[76] Inventor: James A. Abernathy, 216 Park Ave., Monterey, Calif. 93940

[21] Appl. No.: 916,232

[22] Filed: Jun. 16, 1978

[51] Int. Cl.³ .............................................. B05B 1/28
[52] U.S. Cl. .................................. 47/1 R; 239/104; 239/288; 239/328; 239/566
[58] Field of Search ............... 239/104, 207, 288, 289, 239/328, 566; 222/152, 193, 527; 47/1.7, 1

[56] References Cited

U.S. PATENT DOCUMENTS

| | | | |
|---|---|---|---|
| 192,100 | 6/1877 | Walker et al. | 239/566 X |
| 876,362 | 1/1908 | La May | 222/193 |
| 1,527,669 | 2/1925 | Camp | 47/1.7 X |
| 2,530,039 | 11/1950 | Ashcraft | 222/193 X |
| 3,681,872 | 8/1972 | Leitch | 239/104 X |

*Primary Examiner*—Robert W. Saifer
*Attorney, Agent, or Firm*—Howard I. Podell

[57] ABSTRACT

A sprayer which includes a plastic bag having in its upper end a perforated pipe and adapted to receive the end of a syringe and a draw string at the bottom for securing the bag around a flower pot to retain therein insecticidal sprays or powder.

4 Claims, 2 Drawing Figures

U.S. Patent  Sep. 23, 1980  4,223,477

# HOUSE PLANT SPRAYER SHROUD

FIELD OF THE INVENTION

This invention relates generally to a shower and powder sprayer for potted plants.

DESCRIPTION OF THE PRIOR ART

The prior art, as exemplified by U.S. Pat. Nos. 3,373,525; 3,375,208; 3,214,865; 757,045; 2,725,675; 3,653,150; and 3,698,131 is generally illustrative of the pertinent are but the aforementioned patents are non-applicable to the present invention. While the prior art expedients are generally acceptable for their intended purposes only, they have not proven entirely satisfactory in that they are either complex and expensive to manufacture, or bulky and inconvenient to use, or to operate. As a result of the shortcomings of the prior art, typified by the above, there has developed a substantial need for improvement in this field.

The principal object of this invention is to provide a device or article of this character which combines simplicity, strength and durability in a high degree, together with inexpensiveness of construction owing to a minimum of parts so as to encourage widespread use thereof.

Additional objects and advantages of the invention will be set forth in part in the description which follows and in part will be obvious from the description, or may be realized by practice of the invention, the objects and advantages being realized and attained by means of the instrumentalities and combinations particularly pointed out in the appended claims.

SUMMARY OF THE INVENTION

This invention resides in a sprayer which includes a plastic bag having in its upper end a perforated pipe and adapted to receive the end of a syringe and a draw string at the bottom for securing the bag around a flower pot to retain therein insecticidal sprays or powder.

BRIEF DESCRIPTION OF THE DRAWING

In the accompanying drawing, in which is shown one of the various possible illustrative embodiments of this invention, wherein like reference character identify the same or like parts.

DESCRIPTION OF THE PREFERRED EMBODIMENTS

Figure 1:
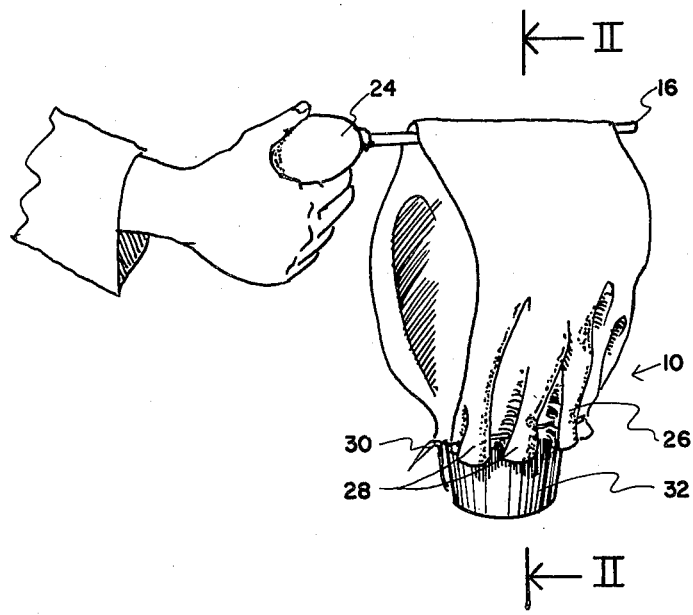
FIG. 1 is a perspective view of the bag of the invention.
Figure 2:
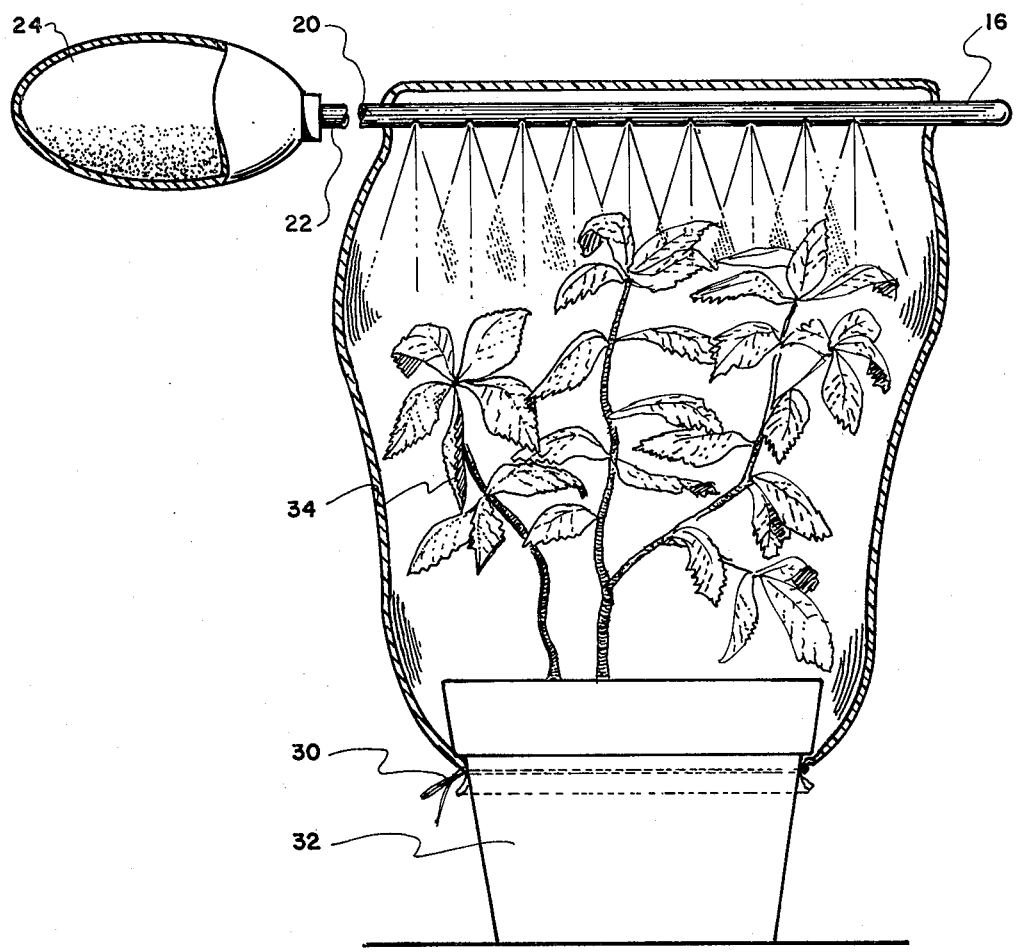
FIG. 2 is a cross-sectional view of same taken through line II—II of FIG. 1.

With reference to the drawing, there is shown and illustrated a shower and powder sprayer constructed in accordance with the principles of the invention and designated generally by reference character 10. The illustrated tangible embodiment of the invention includes a generally rectangular bag 12 manufactured from polyethylene or "Mylar" or other suitable plastic powder. A plastic pipe 14 six to forty-eight inches long is secured in the upper part of bag 12. Pipe 14 is closed at one end 16 and has a plurality of perforations 18 therein. The other end 20 of pipe 14 is open and is adapted to receive therein the tubular end 22 of syringe 24. Syringe 24 is used to aspirate spray solution or powder which is then forced out and through perforations 18 to diffuse through the inside of bag 12. The lower end of bag 12 has pleats 26 with aligned openings 28 (FIG. 1) through which is passed a drawstring 30 for securing the lower end of bag 12 around a flower pot 32.

Use of the assembly of the invention economizes on insecticides which are retained around plant 34 instead of dissipating wastefully into the ambient air and annoying persons in the room.

The operation and use of the invention hereinabove described will be evident to those skilled in the art to which it relates from a consideration of the foregoing.

The present invention is believed to accomplish among others all of the objects and advantages herein set forth.

Without further analyses, the foregoing will so fully reveal the gist of this invention that those skilled in the art can by applying current knowledge thereto readily adapt it for various applications without omitting certain features which can constitute essential characteristics of the generic or specific aspects of this invention. Therefore, a more lengthy description is deemed unnecessary.

It is intended that various changes may be made in this invention in the practical development thereof, if desired. Such changes are comprehended within the meaning and range of equivalency of the following claims. The invention, therefore, is not to be restricted except as is necessitated by the prior art.

Having thus described the invention, what is claimed as new and to be secured by Letters Patent is:

1. A spraying assembly for potted plants comprising a flexible plastic bag formed at one end with an opening,
   a tubular member extending into the bag at a distance from said opening, said tubular member having a closed end and an open end, with a plurality of outlet openings in said tubular member located so as to be within the confines of the bag in the operating position of the assembly,
   syringe means adapted for attachment to the open end of the tubular member, and
   means for detachably fixing the opening of the bag about the external sides of an upright flower pot so that the tubular member in the bag extends above the flower pot, such that
   fluid material in said syringe, when the syringe is attached to the tubular member, may be ejected through the outlet openings of the tubular member into the interior of the bag to spray a plant in a flower pot, about the external sides of which, the bag is detachably fixed, with the wall of the bag serving to confine the said fluid material within the interior of the bag.

2. The combination as recited in claim 1 in which the fluid material is in the form of a powder.

3. The combination as recited in claim 1 in which the fluid material is an insecticide.

4. The combination as recited in claim 1 in which the means for detachably fixing the opening of the bag comprise a drawstring threaded through holes in the wall of the bag adjacent the opening of the bag, said wall of the bag adjacent the said opening being of a size to tighten about the external wall of a flower pot when tension is applied to said drawstring from the ends thereof.

* * * * *